I. A. ANTILLA.
GATHERING AND DUMPING WAGON.
APPLICATION FILED JAN. 5, 1915.

1,182,884.  Patented May 16, 1916.

Witnesses
Edward H. Young

Inventor
I. A. Antilla
By W. J. Fitz Gerald & Co.
Attorney

UNITED STATES PATENT OFFICE.

TOIVA A. ANTILLA, OF KEWEENAW BAY, MICHIGAN.

GATHERING AND DUMPING WAGON.

1,182,884.  Specification of Letters Patent.  Patented May 16, 1916.

Application filed January 5, 1915. Serial No. 620.

*To all whom it may concern:*

Be it known that I, TOIVA A. ANTILLA, a citizen of the United States, residing at Keweenaw Bay, in the county of Baraga and State of Michigan, have invented certain new and useful Improvements in Gathering and Dumping Wagons; and I do hereby declare the following to be a full, clear, and exact description of the invention, such as will enable others skilled in the art to which it appertains to make and use the same.

This invention relates to gathering and dumping wagons and in particular to wagons adapted to gather brush, trash, etc., and then later to dump said gathered brush, trash, etc., at a desired point.

One of the objects of this invention is to provide an arrangement whereby brush, trash, etc., can be readily conveyed up into the wagon and then back into the dumping portion of the wagon.

Another object of this invention is to provide an arrangement whereby the dumping portion of the wagon can be automatically unlocked and opened from the front part of the wagon.

Another object of this invention is to provide an arrangement whereby the gathering parts can be suitably adjusted as desired.

Other objects and advantages of this invention will be hereinafter more clearly set forth in the specification, pointed out in the claims, and illustrated in the accompanying drawings.

Figure 1:
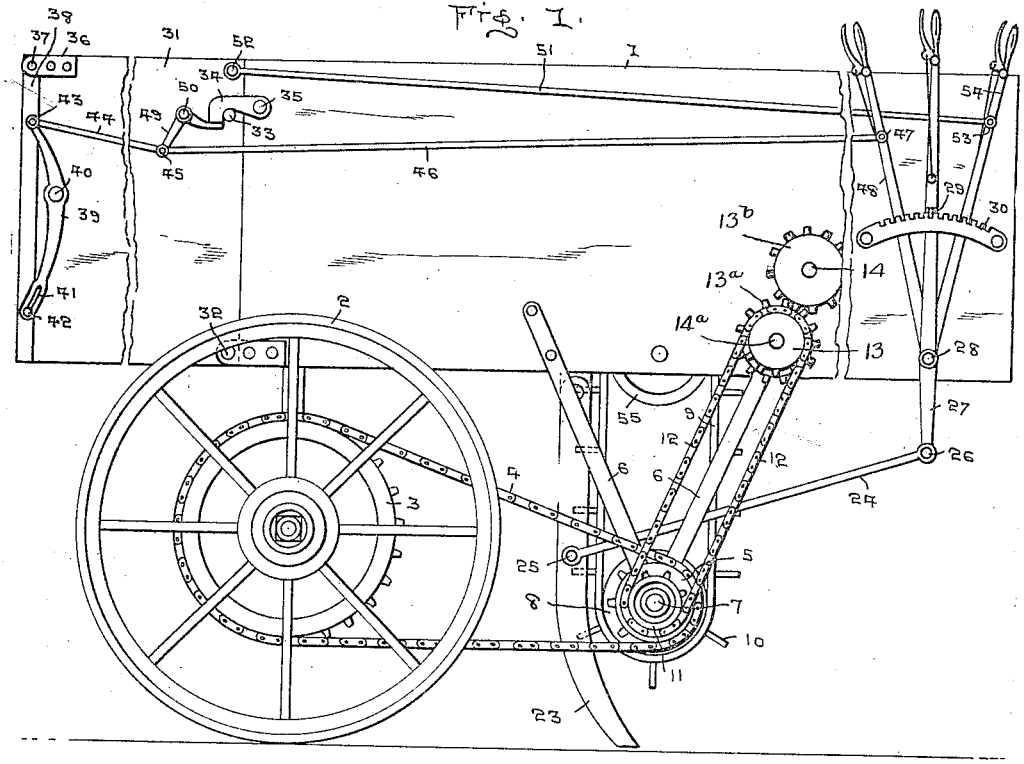
Figure 2:
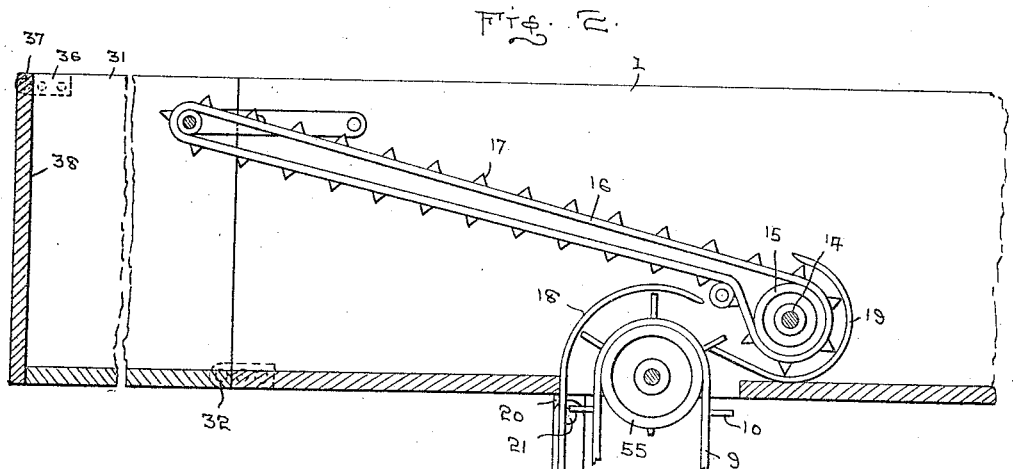

Similar characters of reference refer to similar parts throughout the specifications and drawings, in which, Figure 1 is a side view of the device in assembled formation with the dumping portion closed, and Fig. 2 is a sectional elevation of the rear portion of the wagon showing the means of transferring the gathered brush, trash, etc., from the elevating conveyer to the transferring conveyer.

In the drawings, 1 is a wagon body of the usual form of construction, having the usual rear wheels 2 mounted in the usual manner. A sprocket wheel 3 is attached to the rear wheel in any desired manner, from which operates the endless driving chain 4 adapted to be operated by the sprocket wheel 3 upon the rotation of the wheels 2. The driving chain 4 operates a sprocket 5 which is mounted upon a shaft 7 carried by a brace support 6. The sprocket 5 operates the axle 7 upon which it is rigidly mounted, which in turn rotates a cylindrical wheel 8, upon which is mounted to be driven thereby, an endless conveyer 9 having suitable slats or pins 10 mounted thereon for the purpose hereinafter described. A second sprocket wheel 11 is mounted upon the axle 7 and adapted to be driven thereby, and extending around said sprocket wheel is an endless operating chain 12. The chain 12 also extends around and operates a third sprocket wheel 13 which is rigidly mounted upon a stub shaft 14$^a$, said stub shaft having a gear 13$^a$ fixed to the sprocket 13 which meshes with a similar gear 13$^b$ carried by a shafting 14, upon which is rigidly mounted a cylindrical wheel 15 adapted to carry and operate a transferring conveyer 16, said last mentioned conveyer having suitable slats 17 transversely formed thereacross for the purpose hereinafter described.

A shield 18 is placed in the rear of and over the upper end of the conveyer 9 closely adjacent the ends of the slats 10 so as to retain the gathered brush, trash, etc., upon the slats 10 until said slats have traveled over the supporting wheel 55 so that the brush, etc., will descend by gravity upon a second shield 19 mounted around the end of the second conveyer 16 adjacent the ends of the transfer slats 17 so that said transfer slats 17 will engage the dumped brush, trash, etc., and carry the same around and upon the transferring conveyer until it reaches the rear end of said conveyer, where it is properly dropped into the dumping portion of the wagon 1. Suitable supports 20 depend from the floor of the wagon 1, to which are pivoted as at 21, a plurality of gathering teeth 22, the lower portions 23 thereof being slightly curved forwardly. Said teeth are adapted to collect the trash, brush, etc., as the wagon is moved forwardly, said collected brush being engaged by the slats 10, previously described, elevated and transferred to the second mentioned conveyer 16 in the manner as previously set forth.

A link rod 24 is provided as at 25 to the gathering teeth 22, the opposite end of which is pivoted as at 26 to an operating lever 27. The operating lever 27 is pivoted as at 28 to the side of the wagon 1 and is adapted to engage and be locked into adjusted position by means of a locking pawl 29 and rack 30, as clearly shown in Fig. 1 of the drawings. By this arrangement the gathering teeth 22 can be adjusted toward or away from the slats 10. The rear or dumping portion 31 of the wagon 1 is pivoted or hinged at 32 to the main body portion of the wagon 1 at the lower rear corners thereof, the dumping portion of the wagon having exterior lugs 33 projecting therefrom adapted to engage under a hook 34 suitably pivoted as at 35 to the wagon body 1 for the purpose of locking the dumping portion 31 in closed position. The upper rear corners of the dumping portion 31 of the wagon have suitable hinges 36 mounted thereupon to which is pivoted at 37 a rear gate 38 which is adapted to close the rear end of the dumping portion 31 of the wagon. A bell-crank-lever 39 is pivoted at 40 to the sides of the dumping portion 31, the lower end of which is slotted, as at 41, in which is adapted to play a projection 42 arranged in the side of the gate 38. The opposite end of the bell-crank-lever 39 is pivoted as at 43 to a link 44, the opposite end of the link 44 being pivotally connected at 45 to a reach rod 46. The forward end of the reach rod 46 is pivoted at 47 to an operating lever 48. A bell-crank-lever 49 is pivoted at 50 to the sides of the dumping portion 31, the lower end of which is pivoted or connected at the connection 45 previously described. The opposite end of the bell-crank-lever 49 engages under the hook portion of the hook 34. A second reach rod 51 is pivoted to the dumping portion 31 at 52, the opposite end being pivotally connected at 53 to an operating lever 54. When it is desired to dump the gathered brush, trash, etc., at a suitable point, the lever 48 is moved forwardly and through the medium of the reach rod 46, the link 44 and the bell-crank-lever 39, opens the gate 38 and it simultaneously operates the bell-crank-lever 49, lifting the hook 34 off of the lug 33 thereby releasing the dumping portion 31. The lever 54 is then moved rearwardly which swings the dumping portion 31 on its pivot and dumps the contents thereof, after which the lever 54 is moved forwardly, closing the dumping portion 31 into locked position while the lever 48 is likewise moved rearwardly to close the gate 38, as illustrated in Fig. 1.

As previously stated, the gathered brush is engaged by the slats 10 mounted upon the conveyer 9 and is lifted by said conveyer until it passes over the upper cylindrical wheel 55, when it is dumped onto the shield 19 and lifted and transferred along the transferring conveyer 16 until it is properly dumped into the dumping portion of the wagon.

The form herein shown and described is a preferred embodiment of the invention, but the right is expressly reserved to make such alterations and variations therein from time to time as it may be deemed expedient, which will neither depart from the spirit of the invention nor the scope of the claims.

Having now described my invention, what I claim as new and desire to secure by Letters-Patent, is—

1. A dumping wagon, comprising a bed structure, a dumping portion hinged to said bed, a gate pivoted to said dumping portion, a hook carried by the bed adapted to engage and normally hold the dumping portion in fixed position, a lever and reach rod for swinging said gate to open position, and a bell crank lever coöperating with the gate opening means for releasing the hook from engagement with the dumping portion.

2. A dumping wagon, comprising a bed for the vehicle, a dumping portion hingedly secured to the rear end of said bed, a gate pivotally secured to the rear end of the dumping portion, a bell crank lever pivoted to the dumping portion, one end of the lever having a slot, a pin extending through the slot and into the edge of said gate, a link pivoted to the upper end of said bell crank lever, a reach rod pivoted to said link, an operating lever pivoted to the bed adjacent its forward end to which said reach rod is pivotally attached, a second bell crank lever pivoted to the dumping portion, one arm of said second bell crank lever being pivoted to the reach rod, a hook pivoted to the bed, a lug on the dumping portion adapted to be engaged by said hook, the free end of said hook when engaged with the lug resting in the path of the second bell crank lever whereby when the operating lever is moved forwardly the hook will be disengaged from the lug and the gate swung to an open position, and a lever for raising or lowering the dumping portion.

In testimony whereof I have signed my name to this specification in the presence of two subscribing witnesses.

TOIVA A. ANTILL.

Witnesses:
 RUTH I. CREBASSA,
 ALMA HILBERG.